INVENTOR.
MERRILL K. GOULDING
BY FOWLER, KNOBBE
& MARTENS
ATTORNEYS.

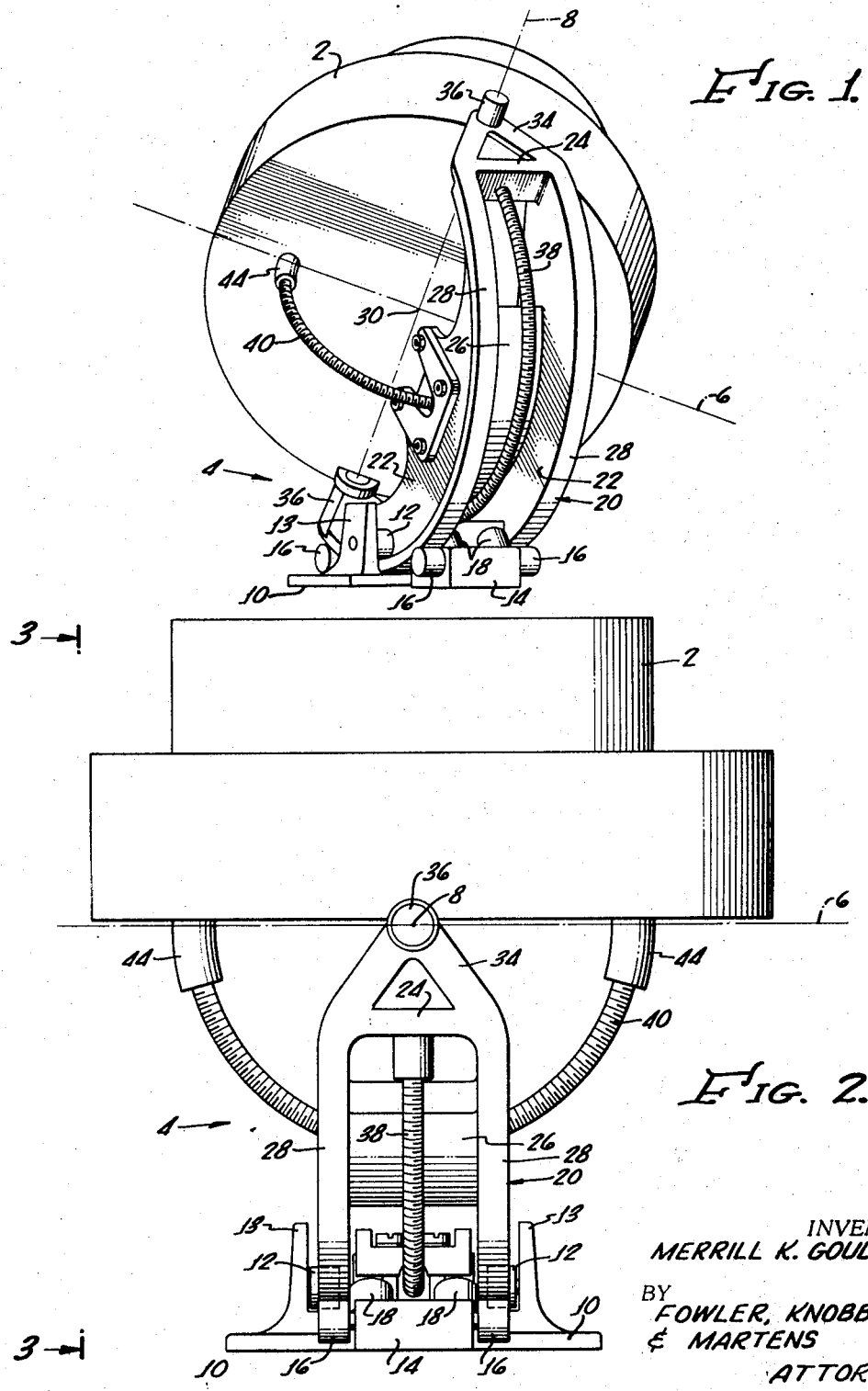

United States Patent Office 3,439,550
Patented Apr. 22, 1969

3,439,550
MECHANICAL MOVEMENT APPARATUS
Merrill Keith Goulding, Glendale, Calif., assignor to
Electronic Specialty Company
Filed Mar. 6, 1967, Ser. No. 620,878
Int. Cl. F16h 29/20
U.S. Cl. 74—89.15     18 Claims

ABSTRACT OF THE DISCLOSURE

A gimbal mechanism includes a pair of helically threaded rods of circular arcuate configuration disposed in mutually perpendicular planes and a ball nut on each rod which is rotated by a direct current motor to pivot the arcuate rod about its center of curvature. The threads on each nut and rod are grooves of a special gothic arch cross section configuration which compensates for the difference in thread pitch between the concave and convex sides of each screw.

Background of invention

This invention relates to mechanism for moving a load responsive to rotation of a nut on a screw and, more particularly relates to such mechanism in which the screw is of arcuate configuration.

The aerospace and defense industries continuously demand more sophisticated control systems, including mechanical control mechanisms, which must fit into very small packages. By way of example, a guidance system for a surface-to-air missile may require a missile mounted antenna which has high RF gain but, because of space, weight and power limitations in the missile, the antenna and the gimbal assembly for positioning it in response to a servo signal should fit in the smallest possible volumetric package with minimal weights, inertias, stresses, power consumption and bearing loads. In addition, a satisfactory gimbal must be capable of positioning a relatively large aperture antenna within a small envelope in the presence of high gravity loads, high vibration, shock and excursion parameters and yet should be capable of back driving, i.e., the antenna should be able to move in response to missile perturbations as if body de-coupled thereby pushing the arcuate screw axially through the nut causing the nut and attendant motor to be driven correspondingly.

Summary of the invention

While no perfect gimbal assembly has been, or probably will be, designed for a surface-to-air missile, this invention presents a unique gimbal design which is extremely well suited for such use. A gimbal constructed in accordance with the teaching of the invention includes a pair of drive screws of circular arcuate configuration with a driving nut on each screw for rotating the screw about its center of curvature responsive to rotation of the nut. The two arcuate screws are connected at their ends to the antenna so as to position the antenna about two mutually perpendicular axes. Such an arrangement permits great variation of the mechanical advantage by appropriate selection of the pitch and radius of curvature of the screw, and permits the driving nut to be press-fit into the armature of the driving motor thereby eliminating inefficient drive trains. Moreover, the drive motor can be positioned beneath the antenna where it does not unduly limit the sweep of the antenna and where it occupies space which otherwise might be wasted.

Problems are encountered in constructing a gimbal with arcuate screws, however, because the threads on the convex side of an arcuate screw are necessarily further apart, or of greater pitch, than those on the concave side. As the nut rotates about the screw, the threads of the nut must cooperate with the varying pitch threads of the screw. If conventional thread designs are used this pitch differential will greatly increase the friction, making high speed response impractical, and will cause "freezing" if the bend in the screw is of small radius.

This invention overcomes these problems by the use of a ball nut and ball screw of novel design and thread shape in the gimbal. This coupled with the high mechanical advantage achieved by the screw arrangement permits low power consumption while retaining a high response. Moreover, by appropriately designing the grooves of the screw and nut with respect to the ball diameter in accordance with the teaching of this invention, backlash or sloppiness can be virtually eliminated from the gimbal while maintaining friction and ball wear at low levels.

While this invention is useful in a gimbal system as described above, it is also applicable to other devices. Broadly, the invention comprises apparatus for moving a load including a nut, an arcuate threaded rod, and means for rotating the nut. In the exemplary embodiments the nut is mounted on a base and is fixed against translation relative to the base. The threads on the nut cooperate with those on the rod to advance the rod through the nut responsive to rotation of the nut. The rod is guided as it advances through the nut so that it rotates in a plane which includes the axis of rotation of the nut.

Furher, in the exemplary embodiments of the invention, the threads on the nut are straight helical grooves and those on the rod are arcuate helical grooves, i.e., a straight helix which has been bent along its longitudinal axis to an arcuate configuration, or a helix wound around an arcuate axis. A plurality of balls engaged in the grooves cause the rod to advance responsive to rotation of the nut. The grooves are of gothic arch cross-sectional configuration, designed to be particularly adaptable to compensating for the difference in pitch between the concave side of the arcuate screw and the convex side.

Moreover, in the illustrative embodiment this invention includes a particular ball nut design which, because of its low rotational resistance characteristics, is particularly adapted for use with the mechanical movement device of this invention.

These and other features, objects and advantages of this invention will be apparent from the following detailed description of two exemplary embodiments of the invention which are illustrated in the accompanying drawings.

Brief description of the drawings

FIG. 1 is a perspective view of a gimbal constructed in accordance with this invention supporting and controlling an exemplary antenna which is illustrated in outline only;

FIG. 2 is an enlarged elevation view of the apparatus illustrated in FIG. 1 showing the antenna in a horizontal position;

*Description of the preferred embodiments*

Figure 3:
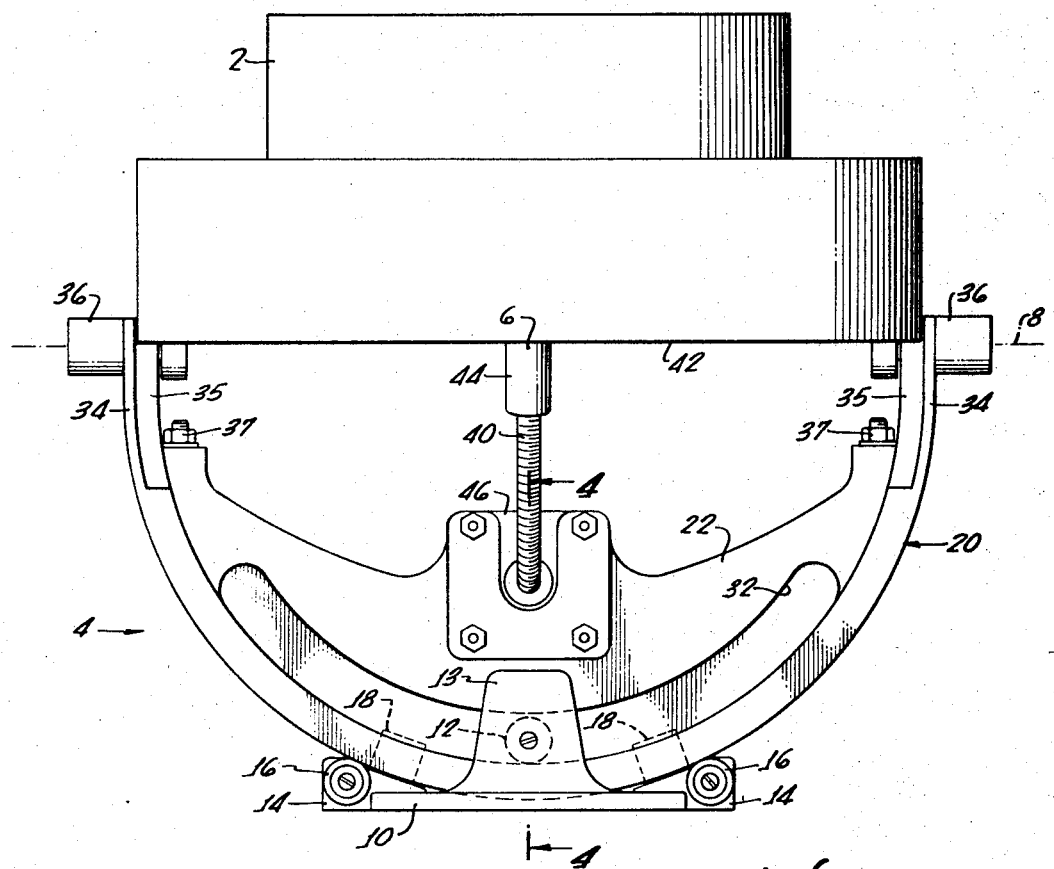
FIG. 3 is an elevational view of the apparatus taken generally along lines 3—3 of FIG. 2.

Referring first to FIGS. 1–3, an exemplary antenna 2 which is illustrated by outline only is mounted on a gimbal assembly 4 for rotation about two mutually perpendicular axes 6 and 8. The gimbal base or support yoke 10 is normally fixed on a deck, not shown. A roller bearing 12 is rotatably mounted on each arm 13 of the support yoke, the axis of rotation of the bearings 12 being aligned with each other and parallel to the cross elevation axis 6. A pair of bearing blocks 14 extend outwardly from opposite sides of the base 10 and each block has a pair of horizontal roller bearings 16 mounted on its opposite ends for rotation about a common axis parallel to the axis 6. A pair of upwardly and inwardly inclined tapered roller bearings 18 is also mounted on each block 14 for rotation about parallel axes which are perpendicular to the axis 6.

A cross elevation frame or yoke 20 includes a pair of upright plates 22 held in spaced-apart relationship by cross braces 24 at opposite ends of the plates and by a central spacing member 26. Each of the plates 22 has a lower flange 28 of circular arcuate configuration the underside of which is supported on two of the horizontal roller bearings 16. One of the horizontal roller bearings 12 contacts the upper edge of each flange 28, and one of the inclined bearings 18 contacts the inner face of each plate 22. Thus, the yoke 20 is mounted for rotation on the base 10 about the cross elevation axis 6 which extends perpendicularly through the center of curvature 30 of the flange. As is shown in FIGS. 3 and 4, the outside face of each of the upright plates 22 has an arcuate longitudinal groove 32 immediately above the flange 28 for receiving the horizontal bearing 12.

A pair of triangular brackets 34 extend upwardly from opposite ends of the flanges 28 and the antenna 2 is pivotally mounted on the brackets 34 in a pair of bearings 36 which are aligned with the elevation axis 8. Thus, as the antenna is rotated on the bearing 36, it pivots about the elevation axis 8 and as the circular flange 28 is moved past the horizontal bearings 12 and 16 the antenna pivots about the cross elevation axis 6. A recess 35 on each side of each bracket 34 permits the antenna to rotate without interference with the bracket.

A cross elevation drive screw 38 of circular arcuate configuration is disposed between the upright plates 22 and is fixed at its opposite ends to the cross braces 24 by nut 37. The screw 38 is designed so as to be in a plane perpendicular to the cross elevation axis 6 and have its center of curvature 30 precisely on that axis. An elevation drive screw 40 of circular arcuate configuration is affixed at its opposite ends to the underside of the antenna platform 42 by connectors 44. The screw 40 is disposed in a plane perpendicular to the elevation axis 8 with its center of curvature 30 on that axis and coincident with the center of curvature of the cross elevation axis 6.

Figure 4:
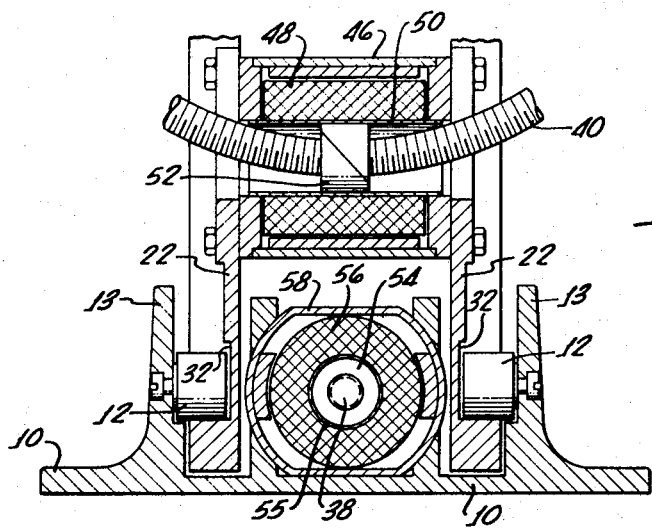
FIG. 4 is an enlarged section through a portion of the apparatus taken generally along lines 4—4 of FIG. 3 particularly illustrating the driving portions of the gimbal mechanism.

As shown in FIG. 4, a small motor 46 bolted between the upright plates 22 has its armature 48 encompassing the elevation screw 40. A sleeve 50 inserted through the armature of the elevation motor 46 is press fit around a ball nut 52 which is threaded on the elevation screw 40. The ball nut 52 can be rotated in either direction by the motor 46 to rotate the antenna 2 about the elevation axis 8. A ball nut 54 threaded on the cross elevation screw 38 is press fit into a sleeve 55 which is fixed to the armature 56 of another motor 58 encompassing the nut 54. The motor 58 is suitably mounted on the base 10. The ball nut 54 can be rotated in either direction by the motor 58 to rotate the yoke 20 and antenna 2 about the cross elevation axis 6. Preferably direct current motors are used because of their high power to weight ratio.

Figure 5:
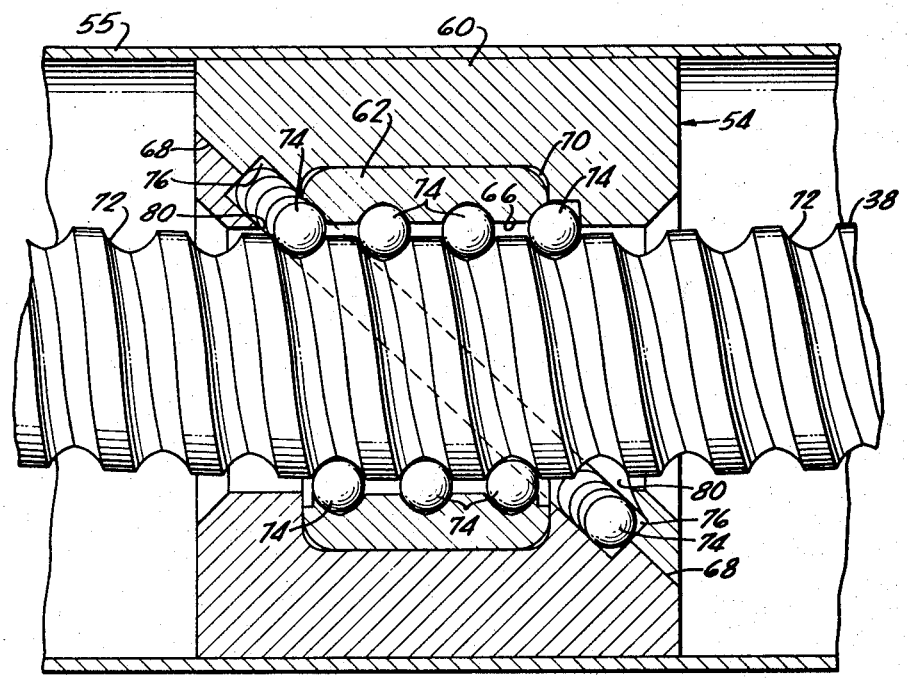
FIG. 5 is a further enlarged section through a portion of the drive mechanism illustrating the structure of the arcuate screw and the ball nut.
Figure 6:
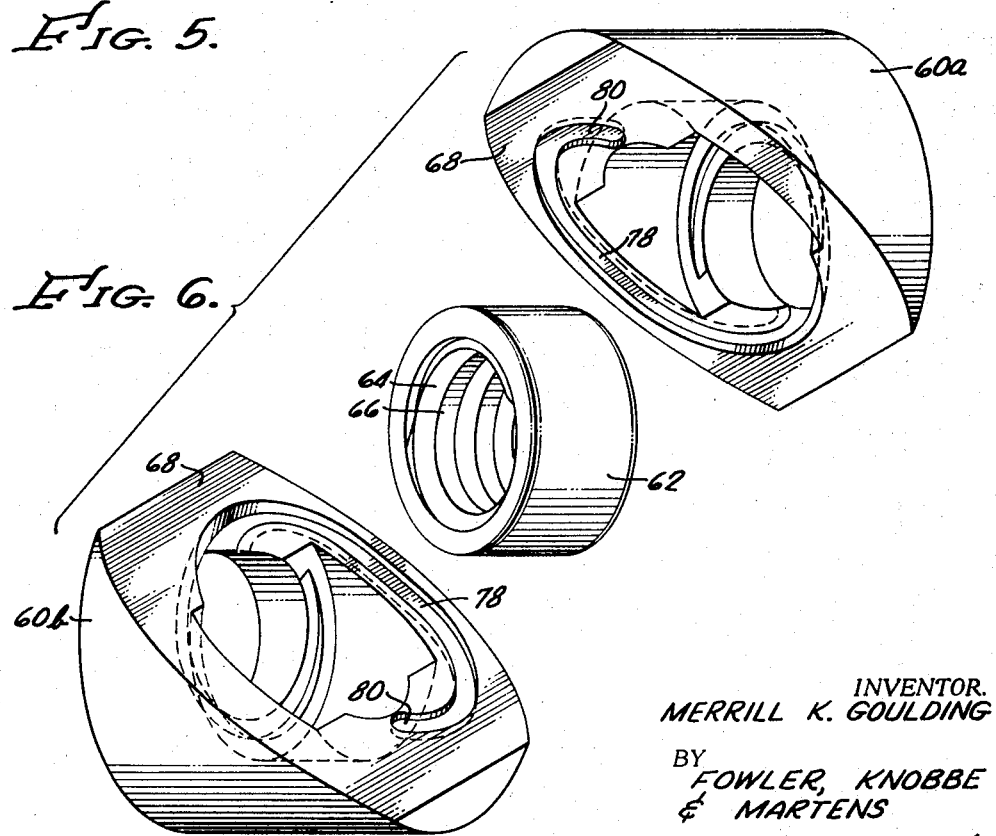
FIG. 6 is an exploded perspective view of the ball nut with the balls removed.

As both of the nuts are of the same construction, only the cross elevation nut 54 will be described in detail. Referring to FIGS. 5 and 6, that nut includes an outer cylindrical housing member 60 and an inner cylindrical threaded member 62 having an internal helical groove 64 formed in its inner wall 66. The housing member 60 is constructed in two parts, 60a and 60b, which are joined along a diagonal interface 68 to tightly enclose the threaded nut member 62 within a cavity 70 so that the threaded member 62 rotates with the housing member 60. The two halves, 60a and 60b, of the housing member 60 may be fixed together or can be held together by the sleeve 55 into which the housing is press fit.

Figure 9:
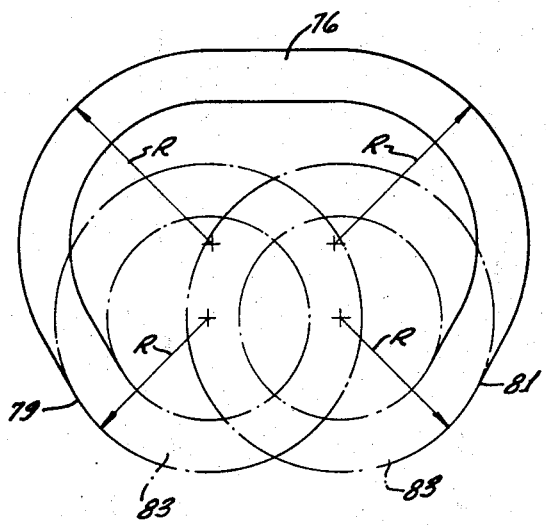
FIG. 9 is a schematic illustration of the path of the balls through the recirculation groove of the nut.

The arcuate helical thread on the screw 38 and the straight helical thread in the nut 54 are grooves 72, and a plurality of balls 74 are engaged between the grooves of the screw and the grooves of the nut. As the nut is rotated in either direction, the balls 74 roll on both the nut and screw threads and transmit the rotating force of the nut to the screw to cause longitudinal movement of the screw. A ball recirculation groove 76 in the housing member 60 interconnects the opposite ends of the helical nut thread 64 so that the path of the balls is a continuous loop. Thus, the ball path includes an operating helical portion and the recirculating portion. The recirculation groove 76 has a central portion 78 which is formed along the interface of the two halves 60a and 60b of the housing members and two end portions 80 each of which is tangent to the nut threads at one end. The recirculation path extends around the longitudinal axis 110 of the nut so that any selected number of degrees of rotation can be provided for the operating portion of the groove. As is shown in FIG. 9, in which the recirculation path is rolled into the plane of the drawing, the path of the balls has no sharp corners. In the preferred embodiment, the radius of curvature R at the entrance 79 and exit 81 as well as in the remainder of the recirculation path is at least as large as the radius of curvature of the operating helical portion 83, thereby reducing resistance to the movement of the balls.

Figure 7:
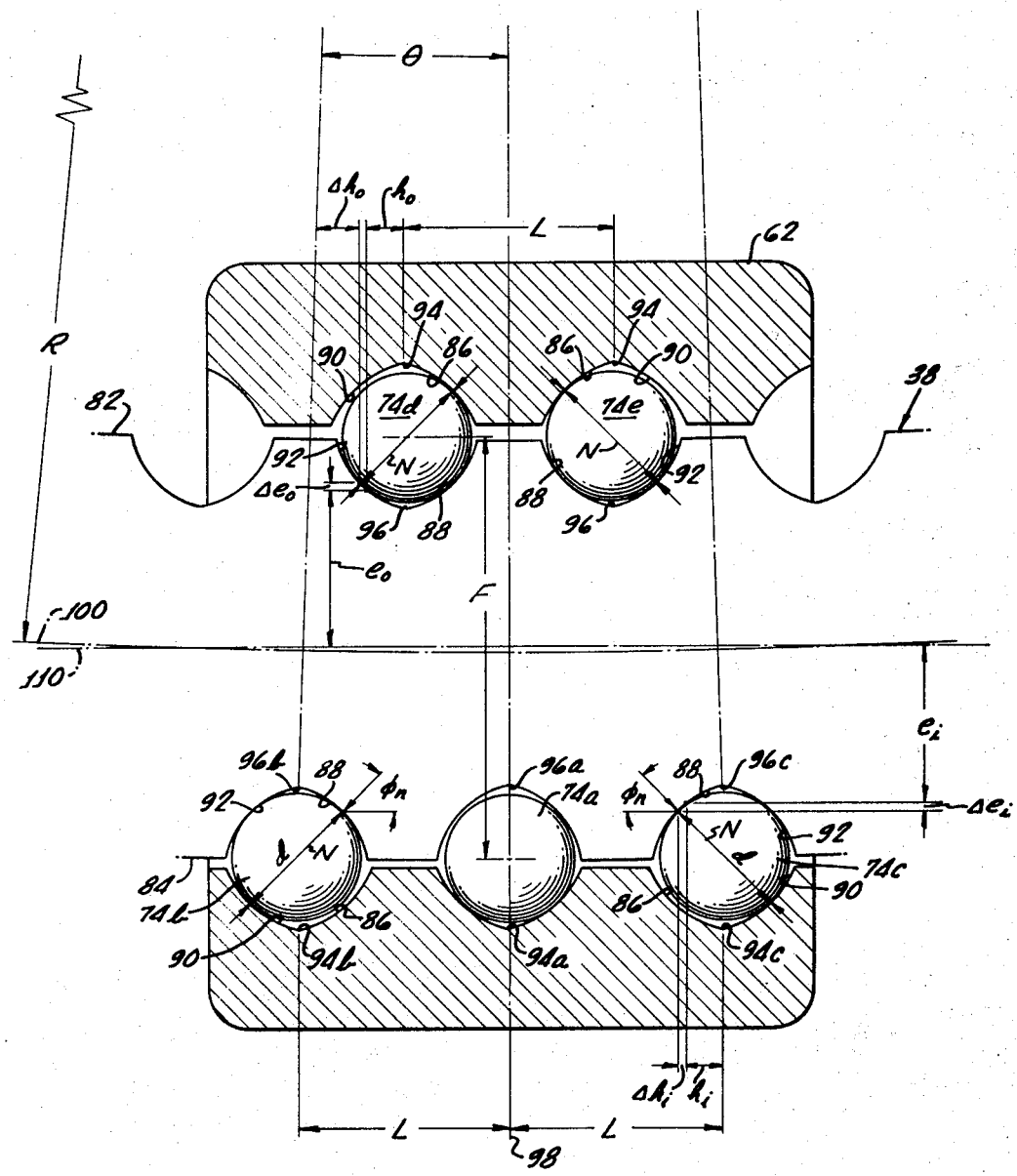
FIG. 7 is a further enlarged somewhat schematic illustration of the ball nut and arcuate screw illustrating the dimensional relationship of the nut, screw, and balls.

Referring now to FIG. 7, the pitch or distance between adjacent grooves is less on the concave side 82 of the screw than on the convex side 84 of the screw, since for any selected central angle $\theta$ the distance along the concave side of the screw is less than the distance along the convex side of the screw. The pitch of the nut grooves is intermediate the two extreme pitches of the screw grooves.

The groove of both the nut and the screw are of gothic arch cross-sectional configuration defined by a circular arcuate inboard side wall 86 and 88 respectively toward the transverse centerline 98 and a circular arcuate outboard side wall 90 and 92 respectively which intersect at the apex 94 and 96 respectively of the groove. In the exemplary embodiment, the nut threads extend a total of 720°.

Because of the differences between the intermediate pitch of the nut and the two extreme pitches of the screw, if a portion of the nut groove, e.g. 94a, is aligned opposite a portion of the screw groove, e.g. 96a, at the transverse centerline 98 of the nut, the screw grooves on the convex side 84 of the screw gain on the nut grooves as they go in both directions away from the transverse centerline 98, i.e. the screw grooves, e.g., 96b and 96c, are offset outwardly from the nut grooves, e.g. 94b and 94c, this offset increasing with the distance away from the transverse centerline 98. On the other hand, the screw grooves on the concave side 82 of the screw lose on the nut grooves, i.e. they are offset toward the transverse centerline 98, again the offset increasing with the distance away from the transverse centerline.

The ball diameter $d$ preferably is selected with respect to the groove dimensions so that at all times at least two balls are engaged between opposed walls of the screw groove and nut groove, at least one ball exerting a force N on the screw which has a component in one direction along the longitudinal centerline 100 of the screw and at least one ball exerting a force N on the screw with a component in the opposite direction along the longitudinal centerline 100. Thus, the nut may be rotated in either direction and the response of the screw is immediate without any sloppiness.

Figure 8:
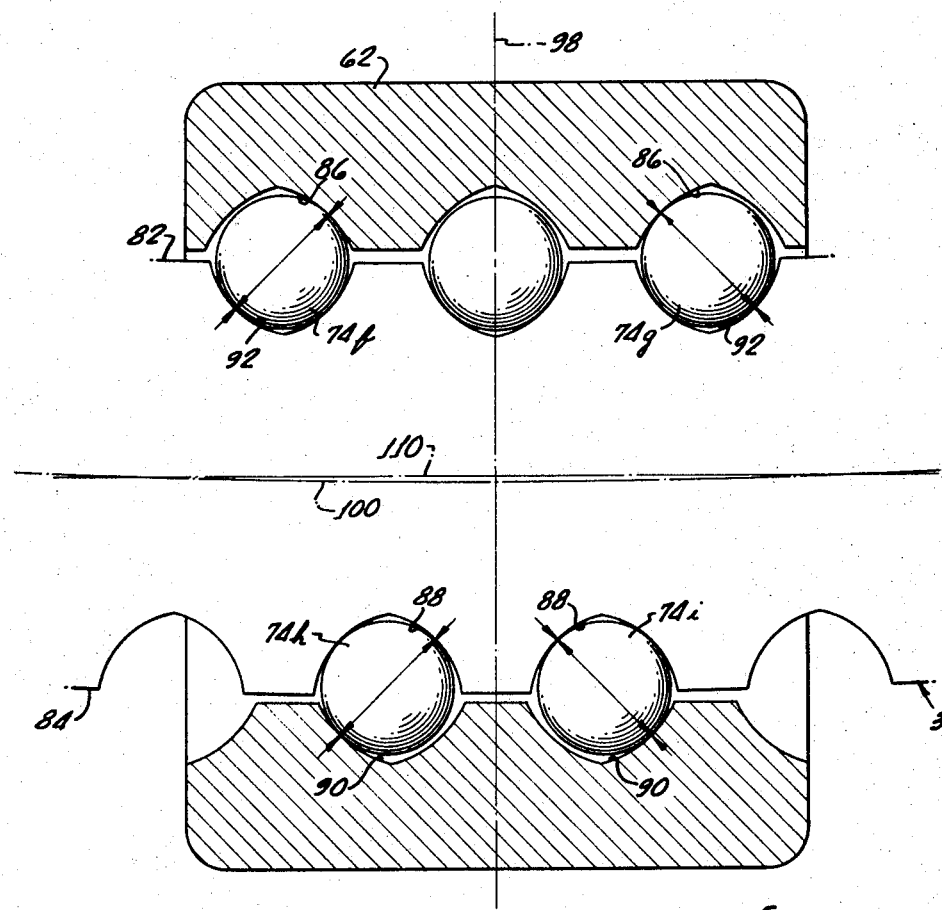
FIG. 8 is a view similar to that of FIG. 7 but with the nut rotated 180°.

In the embodiment illustrated in FIGS. 7 and 8, each ball, e.g. 74b and 74c simultaneously engages the inboard wall 88 of the screw groove and the outboard wall 90 of the nut groove as it passes each of the two positions on the convex side of the screw furthest from the transverse centerline 98 and each ball, e.g. 74d and 74e, simultaneously engages the outboard wall 92 of the screw groove and the inboard wall 86 of the nut groove as it passes each of the two positions 106 and 108 on the concave side of the screw furthest from the transverse centerline 98. Thus, at least four balls e.g. 74b, 74c, 74d and 74e are always in the engaged or driving position and at times eight balls may be engaged as one ball enters each engaging position and an adjacent ball leaves the same engaging position. An increase in the number of balls which are in the engaged or driving position, of course, reduces the stress on each ball.

As the nut rotates 180° to the position of FIG. 8, and at all intermediate positions, again the four to eight balls, e.g. 74f, 74g, 74h and 74i, at the extreme positions away from the transverse centerline 98 on both the convex and concave side will be engaged; those on the convex side 84 being engaged between the inboard wall 88 of the screw and the outboard wall 90 of the nut and those on the concave side 82 being engaged between the outboard wall 92 of the screw and the inboard wall 86 of the nut.

In practice it has been found preferable to size the balls at nearly the same diameter as the distance between the opposite groove walls at the engaged positions in those applications where practically no backlash or sloppiness can be tolerated and response must be immediate. For example, in one gimbal design balls of 0.0600″ diameter have been found satisfactory with the narrowest positions of the passage having a distance between opposed walls of 0.0604″. If this passage at the narrower point is much larger than the diameter of the ball undesired sloppiness or backlash results, and if it is smaller than the ball diameter, the force required to drive the nut is substantially increased and the life of the balls is decreased. Ball wear can be a substantial problem because of the repetitive pinching and freeing of the balls, but has been found not to be a serious limitation on the life of the apparatus if designed in accordance with the above criteria.

Preferably the angle $\phi$ between the longitudinal centerline 110 of the nut and the normal force N exerted on the screw groove wall by each ball at the engaged position is relatively constant and maintained between about 40° and 50°.

The arcuate threaded rod preferably is formed by cutting or stamping the grooves on a straight rod and then carefully bending the grooved rod to the desired configuration. As the rod is bent, the grooves on the concave side of the arc are displaced toward each other resulting in a smaller pitch and those on the convex side of the arc are displaced away from each other resulting in a larger pitch. Also, as a part of the deformation, the inboard and outboard wall of each groove portion on the concave side 82 of the screw are moved toward each other so as to partially close the groove while the walls of each groove portion on the convex side 84 of the screw are moved away from each other so as to widen or further open the groove. The amount of displacement of the effective contact points 102 and 104 on the screw and nut groove walls respectively can be calculated for right hand threads in accordance with the following formulas:

$$\Delta e_o = (1-\cos \theta_o)(R+e_o) + \sigma\left[\frac{L-2h_o(1+\tan \lambda \cdot \sin \lambda)}{L} \Delta h_o\right] \cos (\psi-\Delta\psi)$$

where $\Delta h_o$ is evaluated at $\psi=2\pi$ $$\Delta h_o = L\left(\frac{\psi-\Delta\psi}{2\pi}+h\right)\left[1-(1-\sin \theta_o)\left(\frac{R+e_o}{R}\right)\right]$$

$$\Delta e_i = (1-\cos \theta_i)(R+e_i) + \sigma\left[\frac{L-2h_i(1+\tan \lambda \sin \lambda)}{L} \Delta h_i\right] \cos (\psi+\Delta\psi)$$

where $\Delta h_i$ is evaluated at $\psi=2\pi$ $$\Delta h_i = L\left(\frac{\psi+\Delta\psi}{2\pi}-h\right)\left[1-(1-\sin \theta_i)\left(\frac{R+e_i}{R}\right)\right]$$

Where:

L=pitch
F=ball path diameter
$\lambda$=lead angle of the screw grooves $$=\tan^{-1} \frac{L}{\pi F}$$

$d$=ball diameter
R=radius of curvature of the screw
$\sigma$=Poisson's ratio
$\phi_n$=normal pressure angle with respect to the nut longitudinal centerline
$\psi$=angle of revolution of the groove on either side of transverse centerline in radians $$\Delta\psi = \sin^{-1}\left[\frac{\sin \lambda \frac{d}{2} \cos \lambda}{\frac{F}{2}-\sin \phi_n \cos \lambda \frac{d}{2}}\right]$$

$e$=distance from screw longitudinal centerline to contact point before bending $$=\left(\frac{F}{2}-\sin \phi_n \cos \lambda \frac{d}{2}\right) \cos (\psi \pm \Delta\psi)$$

$h$=distance from transverse center of groove to contact point before bending $$=\cos \phi_n \cos \lambda \frac{d}{2}$$

$\theta$=angle subtended at the screw center of curvature between the transverse centerline and a selected point $$=L\left(\frac{\psi \pm \Delta\psi}{2\pi}\right) \pm \frac{h}{R}$$

$\Delta e$=radial change of contact point due to bending
$\Delta h$=longitudinal change of contact point due to bending, and subscript $i$ has reference to points on the inboard wall of the screw groove and subscript $o$ has reference to points on the outboard wall of the screw groove.

By calculating the displacement for a given situation the optimum groove shape and the optimum ball and groove dimensions for that situation can be determined. While in the described embodiment the compensation is made in the screw groove, it is possible to make at least a portion of the compensation in the nut groove.

The gothic arch configuration has several advantages in addition to flexibility of design for achieving the desired pitch compensation. Any dirt or foreign matter tends to accumulate in the peak of the arch 94 and 96 so that it does not hamper operation of the device until it builds up substantially. In addition, the curved groove walls 86, 88, 90 and 92 contact the ball over a larger area than the area of contact between a straight wall and a ball, thereby reducing the stress on the balls.

Referring now primarily to FIGS. 1–4, the gimbal assembly is operated to position the antenna 2 in elevation by energizing the direct current motor 46 to rotate its armature 48 and the threaded nut 52 in either direction. Rotation of the nut 52 advances the elevation screw 40 through the nut and rotates the screw 40 and the antenna on bearings 36 about the elevation axis 8. The direct current motor 46 is energized through a servo system which does not per se form a part of this invention. When the desired elevational position is reached, the motor is de-energized to hold the elevation screw 40 and the antenna 2 in the desired position. The antenna is positioned in cross elevation in a similar manner by energizing the direct current motor 58 to rotate the nut 54 in the desired direction and rotate the cross elevation screw 38 and the support yoke 20 on the bearings 16 about the cross elevation axis 6.

Referring now to FIGS. 5 and 6, as each of the nuts rotate the balls 74 contained in the nut roll on the screw groove and nut groove surfaces to transmit the rotational force of the nut to longitudinal movement of the screw tangent to the nut longitudinal centerline. The balls 74 recirculate from one end of the nut groove to the other through the recirculation groove 76 in the nut. Because of the shape and dimensioning of the nut groove walls and screw groove walls relative to the balls the nut rotates with very little friction and without substantial backlash irrespective of the differing pitch between the nut and screw.

The screws 38 and 40 and the yoke 20 structure are designed so that the antenna 2 can move approximately 55° in all directions from the horizontal position illustrated in FIGS. 2 and 3. Appropriate stop means and limit switches which are not shown can be provided to limit the movement of the antenna at its extreme positions so as to avoid damage to the assembly. The antenna in the exemplary embodiment, leaves an unswept volume beneath it which defines an upright 70° cone in which the stationary supporting and driving elements are located. The direct current motors are disposed so that they do not interfere with operation of the antenna and permit the antenna to be housed in a small missile nose cone.

Figure 10:
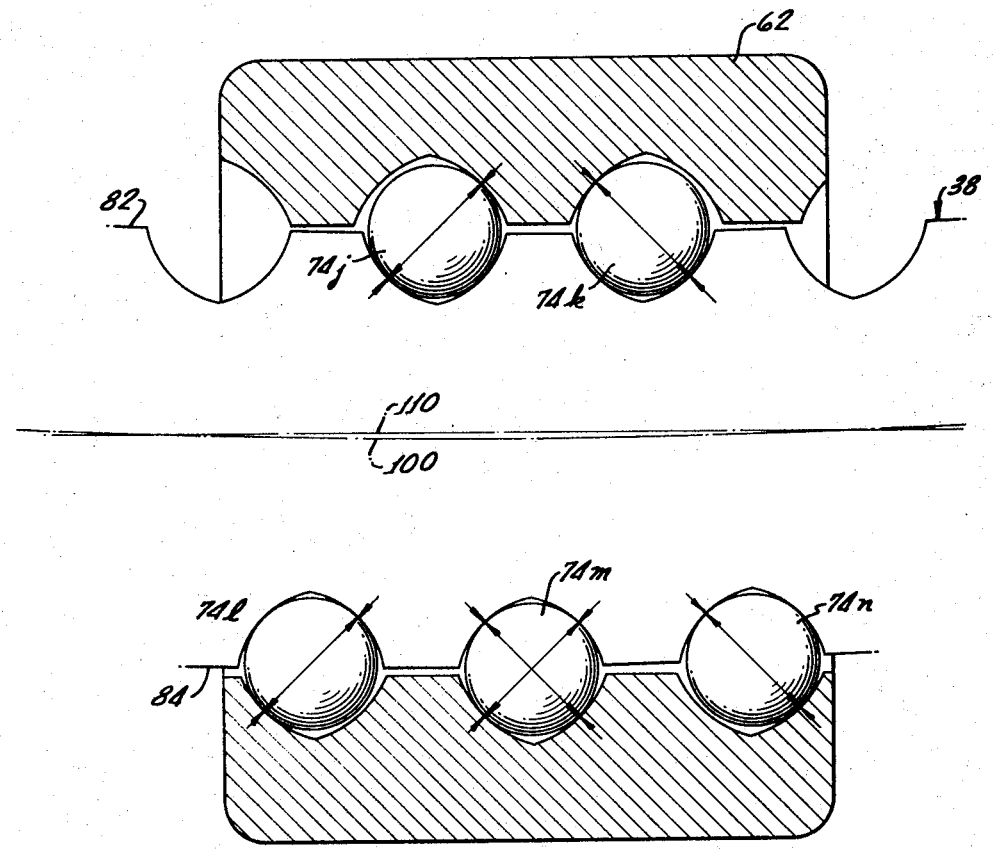
FIG. 10 is a view similar to FIG. 7 illustrating a modified embodiment of the invention.

In the modified embodiment of the invention illustrated in FIG. 10, the walls of the groove in the screw 38 and of the groove in the nut 62 are carefully dimensioned and shaped with respect to the size of the balls 74 so that all, or at least most, of the balls which at the time are disposed in the operative portion of the nut grooves, i.e. not in the recirculation portion, are engaged between two opposite walls. For example balls 74j, 74k, 74l, 74m, and 74n and all or most of the balls between them are engaged between opposite walls. Thus, the rotational force of the nut 62 is transferred to longitudinal movement of the screw 38 by all or nearly all of the balls which at any given moment are in the operative portion of their circulatory path. Calculations similar to those discussed above are used to determine the complex configuration which must be given to the groove walls to achieve this purpose. Such a complex thread section, of course, requires very careful machining.

While this invention has been described with reference to specific preferred embodiments, those embodiments should be considered only exemplary of this invention which shuold be limited only in accordance with the following claims.

I claim:
1. Apparatus for moving a load comprising:
    an elongate rod including an arcuate portion;
    a nut circumscribing the rod in the arcuate portion;
    means on the nut and rod cooperating to advance one relative to the other responsive to rotation of the nut;
    motor means operatively connected to the nut for selective rotation thereof; and
    a load operatively connected to one of the relatively movable members for movement therewith.
2. Apparatus for converting rotary motion about an axis to rotary motion in a plane including that axis comprising:
    a base;
    a nut mounted for rotation on the base about a first axis, said nut having a bore therethrough generally parallel to the first axis;
    means fixing the nut against longitudinal translation relative to the base;
    an elongate rod formed in the configuration of a circular arc extending through the bore of the nut;
    means on the nut and rod cooperating to advance the rod through the nut responsive to rotation of the nut; and
    means guiding the rod as it advances through the nut so that the rod rotates in a plane parallel to the axis of rotation of the nut.
3. Apparatus for converting rotary motion about an axis to rotary motion in a plane in accordance with claim 2, wherein the cooperating means on the nut and rod include:
    a helical groove defined along the length of both the nut and rod; and
    a plurality of balls engaged in the grooves to cause the rod to advance responsive to rotation of the nut.
4. Apparatus for converting rotary motion about an axis to rotary motion in a plane in accordance with claim 2, and further comprising an electric motor on said base having its armature disposed in coaxial circumscribing relationship with said nut and affixed thereto for rotating the nut.
5. Apparatus for transmitting motion comprising:
    an elongate rod having an arcuate portion with an external helical groove formed along its length;
    a nut circumscribing said arcuate rod portion and having an internal helical groove formed along its length with a pitch less than the pitch of the groove on the convex side of the rod and greater than the pitch of the groove on the concave side of the rod; and
    a plurality of balls contained between the nut and screw grooves for cooperating therewith to advance the nut relative to the screw responsive to rotation of the nut.
6. Apparatus for transmitting motion in accordance with claim 5, wherein the balls are sized relative to the grooves such that at all times each of at least two balls is in contact with a nut groove wall and a screw groove wall at points approximately diametrically opposed across the ball.
7. Apparatus for transmitting motion in accordance with claim 6, wherein the normal force exerted on each of said two balls is at an angle of between about 40° and about 50° with respect to the longitudinal axis of the nut.
8. Apparatus for transmitting motion in accordance with claim 5, wherein the balls are sized relative to the grooves such that at all times the majority of the balls contained in the passage defined between the nut groove walls and the screw groove walls are each in contact with a screw groove wall and a nut groove wall at points approximately diametrically opposed across the ball.
9. Apparatus for transmitting motion in accordance with claim 5, wherein the screw groove and the nut groove are each of gothic arch cross-sectional configuration.
10. A gimbal assembly for positioning a body comprising:
    a base;
    first and seconds nuts each mounted for rotation on the base and having an interior wall defining a bore therethrough;
    means fixing the nuts against longitudinal translation relative to the base;
    first and second elongate members each formed in the configuration of a circular arc and extending through a respective one of the bores;
    means on each of said nuts and said elongate members cooperating to advance each elongate member through its associated nut responsive to rotation of the nut;

means affixing the ends of the first elongate member to the body to pivot the body about the center of curvature of the first elongate member responsive to rotation of the first nut; and means affixing the ends of the second elongate member to the body to pivot the body about the center of curvature of the second elongate member as the second nut rotates.

11. A gimbal assembly in accordance with claim 10, wherein:

the means affixing the ends of the first elongate member to the body include a frame which is mounted on the base and affixed to the first elongate member for pivoting therewith;

the second nut is rotatably mounted on the frame and pivots therewith about the center of curvature of the first elongate member but is fixed against longitudinal translation relative to the frame; and, the body is mounted on the frame for pivotal movement relative to the frame about the center of curvature of the second elongate member.

12. A gimbal assembly in accordance with claim 10, wherein the axis about which the first elongate member pivots is perpendicular to the axis about which the second elongate member pivots and both axes are disposed in a common plane.

13. A gimbal assembly in accordance with claim 10, and further comprising first and second direct current motors mounted with their armatures circumscribing and affixed to the first and second nuts respectively for rotation thereof.

14. A gimbal assembly in accordance with claim 10, wherein the cooperating means for advancing the elongate members comprises:

an external arcuate-helical groove on each of the first and second elongate members;

a helical groove on the interior wall of each of said nuts; and a plurality of balls engaged in the grooves to cause the rod to advance responsive to rotation of the nut.

15. A gimbal assembly in accordance with claim 14, wherein each nut further comprises a recirculation groove interconnecting the opposite ends disposed radially outward of the arcuate-helical groove, and interconnecting the opposite ends thereof, the opposite end portions of said recirculation groove being tangent to the end portions of the nut's helical groove, and all portions of the recirculation groove having a radius of curvature at least equal to the radius of curvature of the path of balls engaged between the nut groove and screw groove.

16. A gimbal assembly in accordance with claim 15, wherein the recirculation groove is wound around the longitudinal axis of the nut.

17. A ball nut comprising:

a generally cylindrical body having an outer wall suitable for gripping to rotate the nut and an inner wall defining an axial bore through the body;

a helical operating groove defined in the inner wall of the body;

a recirculation groove defined in the body outward of the helical operating groove;

said recirculation groove having its end portions in communication with and tangent to the opposite end portions of the helical operating groove;

all portions of said recirculation groove having a radius of curvature at least as great as the radius of curvature of the helical operating groove so as to reduce the resistance to movement of balls from one end of the helical operating groove through the recirculation groove to the other end of the helical operating groove;

said body includes an inner nut portion and a surrounding shell portion affixed to the nut portion for rotation together, the helical operating groove being defined in the inner nut portion and the recirculation groove being defined in the outer shell portion;

the outer shell portion including two parts joined along a diagonal interface; and the major portion of the recirculation groove follows the interface of the two parts.

18. A method of constructing a mechanical movement apparatus comprising the steps of:

forming a straight helical groove along a straight elongate rod;

forming a ball nut having a straight helical groove interior thereof, the pitch of the rod helix and of the nut helix being substantially equal;

bending the grooved rod to an arcuate configuration; and threading the ball nut onto the arcuate rod.

References Cited

UNITED STATES PATENTS 3,244,022   4/1966   Wysong _____ 74—424.8

FREDERICK L. MATTESON, JR., *Primary Examiner.*

EDWARD G. FAVORS, *Assistant Examiner.*

U.S. Cl. X.R.

74—424.8; 343—765